United States Patent
Schilsky et al.

(10) Patent No.: US 7,409,052 B1
(45) Date of Patent: Aug. 5, 2008

(54) UNIVERSAL INTERCOM ADAPTER FOR VARYING RESIDENTIAL WIRING SYSTEMS

(76) Inventors: Lawrence D. Schilsky, P.O. Box 138, Briarcliff Manor, NY (US) 10510; Alan Schilsky, 56 Byram Ridge Rd., Armonk, NY (US) 10504

(*) Notice: Subject to any disclaimer, the term of this patent is extended or adjusted under 35 U.S.C. 154(b) by 854 days.

(21) Appl. No.: 10/948,484

(22) Filed: Sep. 24, 2004

(51) Int. Cl.
*H04M 1/60* (2006.01)
*H04M 9/00* (2006.01)
*H01R 29/00* (2006.01)

(52) U.S. Cl. .......................... 379/167.02; 379/167.13; 439/47; 439/49; 439/77; 439/170; 439/628

(58) Field of Classification Search ............ 379/167.01, 379/167.02, 167.04, 167.13, 167.14, 171; 439/43–44, 47–50, 52–53, 77, 166, 170–171, 439/173, 628, 640, 676
See application file for complete search history.

(56) References Cited

U.S. PATENT DOCUMENTS

| 4,485,273 A | 11/1984 | Bartelink |
| 6,773,282 B2* | 8/2004 | Alvey .......................... 439/170 |

* cited by examiner

*Primary Examiner*—Binh K Tieu
(74) *Attorney, Agent, or Firm*—Myron Amer P.C.

(57) ABSTRACT

An intercom adapter used for selecting optionally one of three popular in-place residential wiring systems, in which two switches, each with two circuit-selecting contacts provide four permutations for selecting a circuit compatible for the in-place residential wiring system, to thereby reduce inventory to only the one switch-operated adapter.

1 Claim, 3 Drawing Sheets

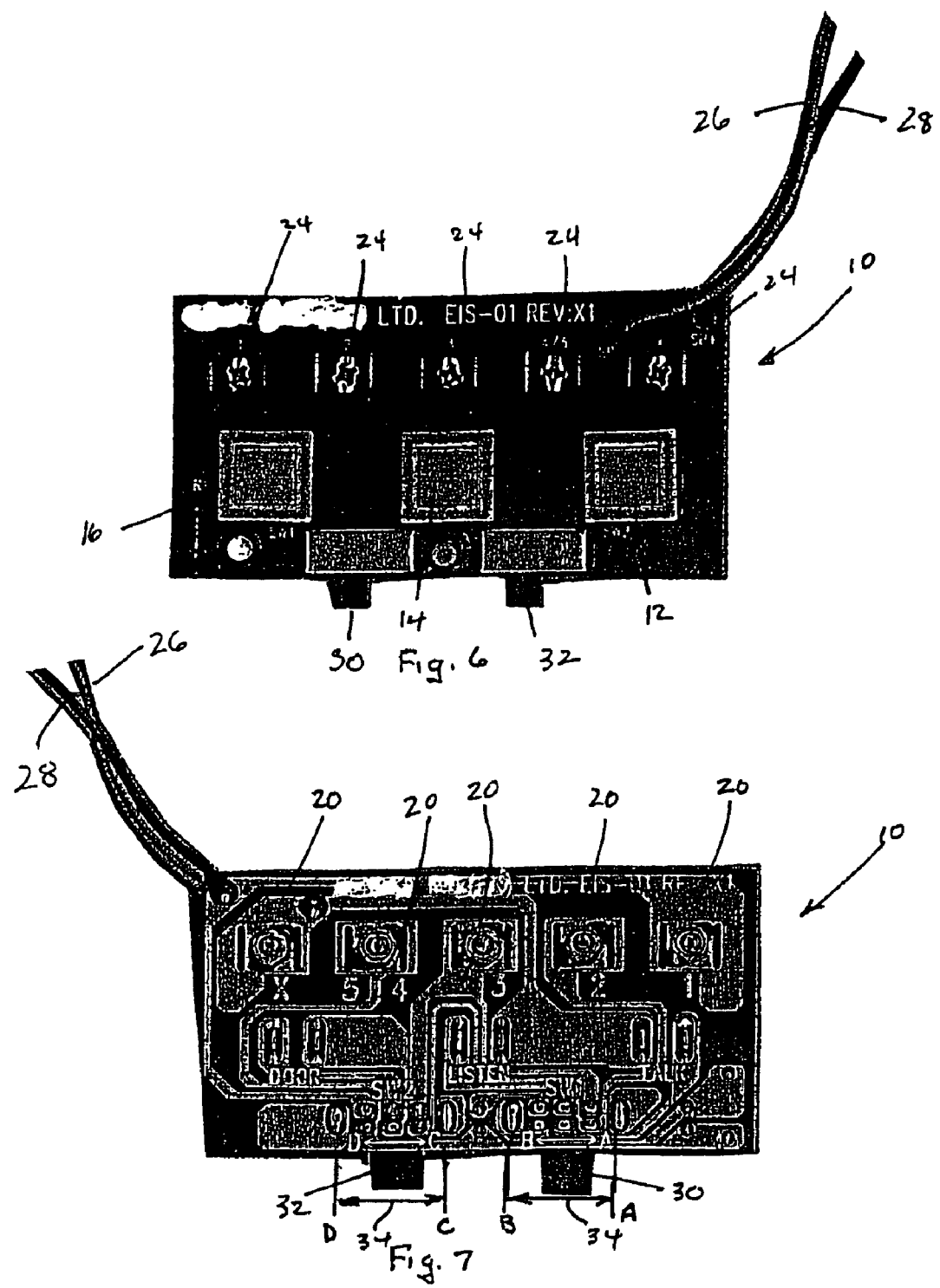

UNIVERSAL INTERCOM ADAPTER FOR VARYING RESIDENTIAL WIRING SYSTEMS

The present invention relates generally to improvements in providing intercom service to existing multi-apartment residential facilities, the improvements, more particularly, proposing a method of achieving compatibility with in-place varying wiring systems of the residential facilities after determining which of a three-wire, a four-wire, or five-wire wiring systems exists at the residential facility that requires repair or otherwise being attended to.

EXAMPLE OF THE PRIOR ART

It is already known, as exemplified by U.S. Pat. No. 4,485,273 for "Intercom Adapter for Telephones" issued to Bartelink on Nov. 27, 1984, that an in-place wiring system at a residential facility or the like, that an enabling adapter is required to take account of the peculiarities of the in-place wiring system in order to obtain intercom service. Thus, the '273 patented adaptor renders operational intercom service for an in-place four-wire system. It is known from common experience however, that in an existing residential facility the in-place wiring system may be a three-wire, four-wire or five-wire system, and the current practice is to stock adaptors compatible to each system and constitutes, needlessly it is believed, in an inventory overstocking practice that is expensive and otherwise disadvantageous.

Broadly, it is an object of the present invention to overcome the foregoing and other shortcomings of the prior art.

More particularly, it is an object to simplify inventory control to a single adaptor readily made compatible for any one of the three popular in-place wiring systems, thereby obviating the need to stock a multitude of adaptors, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a prior art circuit diagram of a residential four-wire wiring system of U.S. Pat. No. 4,485,273, intended to be exemplary also of three-wire, and five-wire residential wiring systems;

FIG. 3 illustrates the intercom in relation to a three-wire residential wiring system;

FIG. 4 illustrates the intercom in relation to a four-wire residential wiring system; and FIG. 5 illustrates the intercom in relation to a five-wire residential wiring system;

FIG. 6 is a front elevational view of a universal intercom adapter in accordance with the present invention; and FIG. 7 is a rear elevational view thereof.

Figure 1:
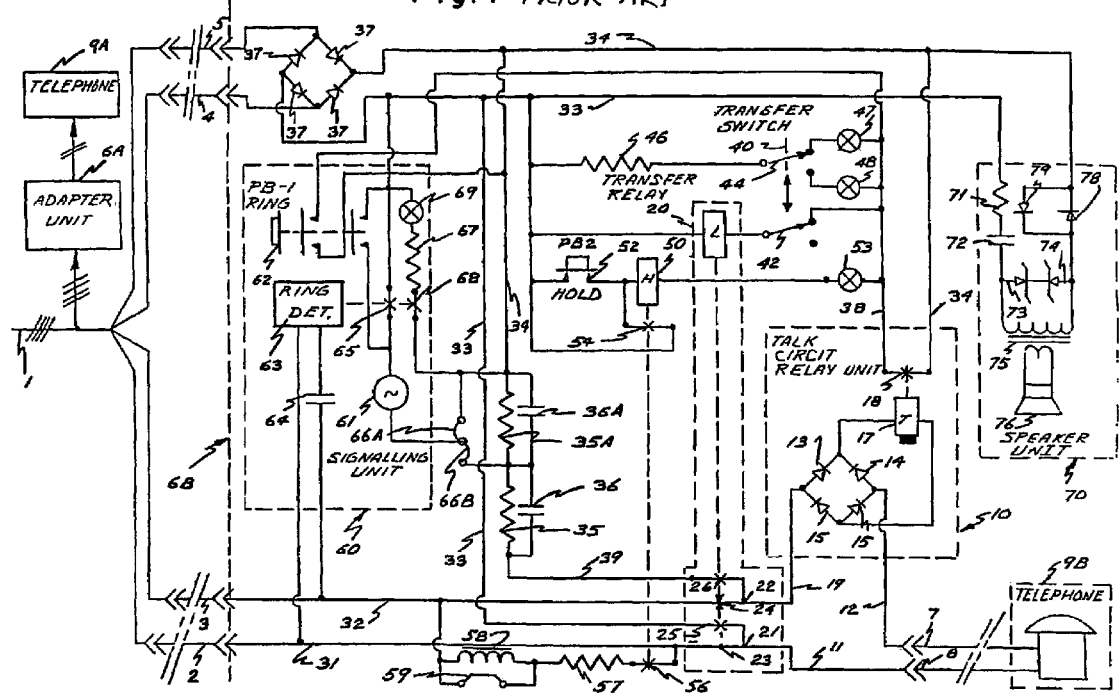
Figure 2:
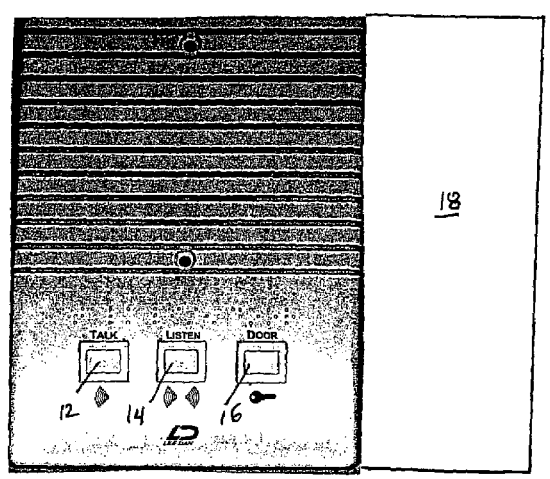
FIG. 2 is a front elevational view of an intercom in connected relation to a residential in-place wiring system.

FIG. 1 is a circuit diagram of U.S. Pat. No. 4,485,273 for "INTERCOM ADAPTER FOR TELEPHONES" incorporated herein by this reference in accordance with MPEP 216307(b), the incorporated technology being an in-place residential wiring system which in the '273 patent is of the four-wire variety, namely, "a four-wire conductor on the subscriber's premises which is connected to a first intercom adapter unit 6A... [including] telephone or other communications terminal 9A [which] is controlled by the adapter 6A (col. 1, lines 5-7, 16, 17)."

Figure 3:
FIG. 3, 4 and 5 are exemplary rear elevational views of the intercom of FIG. 2, in which more particularly.
Figure 4:
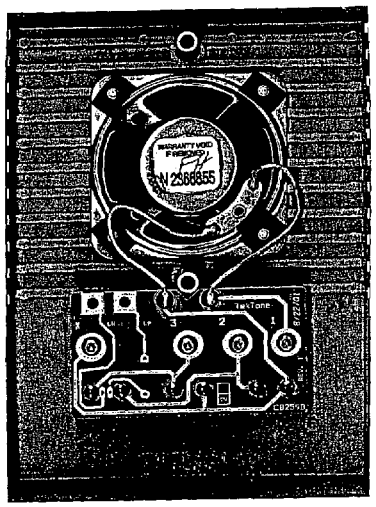
Figure 5:
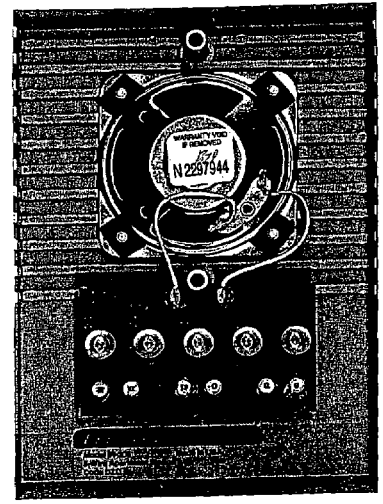

The '273 patent is instructive as background for the universal intercom adapter of the present invention, in providing the same functional compatibility of the in-place residential wiring system as adapter 6A and more specifically for a residential entrance door intercom functioning similarly to telephone 9A of the '273 patent, but having significantly greater utility than the '273 adapter 6A in that, as a single article of manufacture, the inventive adapter is readily capable of providing functional compatibility for the intercom to a three-wire, four-wire or five-wire in-place residential wiring system, thus obviating the need for the stocking of separate specific end-use adapters, as illustrated in FIG. 3, 4 and 5 for respectively three-wire (FIG. 3), four-wire (FIG. 4), and five-wire (FIG. 5) in-place residential wiring systems, respectively generally designated 7, 8 and 9.

For those in the trade of installing in the first instance, or repairing an already installed entrance door intercom, it is strictly by chance whether the residential facility involved has an in-place three-wire, four-wire or five-wire wiring system, said variety of wiring systems, as is well known in the art, being dictated by the functions to be provided by the wiring system, and thus because it is in doubt what the in-place wiring system is, in the residential facility involved, the practice is to stock all wiring system-compatible adapters, in this case the three noted in FIGS. 3, 4 and 5.

Stated somewhat differently, the noted stocking practice has implemented a method enabling operation of intercom service in a multi-apartment residential facility (not shown) having in place therein either a three-wire (FIG. 3), four-wire (FIGS. 1 and 4), or a five-wire (FIG. 5) communication system, in which currently said provided intercom service uses intercom-compatible selected three-wire, four-wire or five-wire circuitry, as exemplified by the circuitry of FIG. 1 for providing a four-wire in-place intercom service. The present invention is an improved method substituting for the noted currently used method which has resulted in the overstocking of the three noted adaptors of FIGS. 3, 4 and 5 and instead proposes a method implementing a stocking only of a sole circuit board article of manufacture of FIGS. 6 and 7, generally designated 10, having accessible on one board side a talk button 12, listen button 14 and door-opening button 16 providing the "talk" and "listening" functions via a combination microphone and speaker unit 18, and embodied on the opposite board side are plural intercom-compatible circuits, individually and collectively designated 20, for providing intercom service for at least the three noted in-place wiring in most residential facilities, obtainable by establishing an electrical connection to contacts individually and collectively designated 24, effective to provide power from electrical conductors 26 and 28 to five leads (not shown) extending from in-place wiring connected to the contacts 24. Between the power input at 26, 28 and the output at the wire lead connection at 24, it is necessary to interpose intercom-compatible circuitry for the in-place wiring at the residential facility, and thus proper selection from the plural intercom-compatible circuits 20 of the one circuit that will work is required.

To this end, the sole circuit board article of manufacture 10 is provided with a first switch 30 and a second switch 32, each located between and manually adapted to be urged in movement as noted at 34, into contact with a first circuitry-selecting contact A and a second circuitry-selecting contact B for switch 30, and for switch 32 a third circuitry-selecting contact C and a fourth circuitry-selecting contact D, thus providing at least three permutations of contact-established conditions consisting first of a first switch 30 first contact A with a second switch 32 third contact C, second of a first switch 30 first contact A with a second switch 32 fourth contact D, and third of a first switch 30 second contact B with a second switch 32 third contact C wherein the exercise of the first option provides circuitry compatible for an in-place three-wire system, the exercise of the second option provides circuitry for an in-place four-wire system and the exercise of the third option provides circuitry compatible for an in-place five-wire system.

Implementing the method of the present invention contemplates traveling to a residential facility initially with an unknown but in-place intercom wiring thereat, identifying whether of a three-wire, four-wire or five-wire intercom wiring is in-place at the residential facility, and installing the sole circuit board article of manufacture 10 at the residential facility.

The final step of the method consists of correlating with the in-place intercom wiring with an exercised permutation of a contact-established condition effective to provide intercom service.

From the foregoing description it should be readily appreciated that inventory of enabling intercom circuitry is confined to the sole circuit board article of manufacture 10.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In a method enabling operation of intercom service in a multi-apartment residential facility having in-place therein either a three-wire, four-wire or a five-wire communication system, in which currently said provided intercom service uses intercom-compatible selected three-wire, four-wire or five-wire circuitry, an improved method substituting for that currently used comprising the steps of:
   A. manufacturing a sole circuit board article of manufacture having:
      1. plural intercom-compatible circuits embodied thereon for at least three-wire, four-wire and five-wire intercom service; and
      2. a first switch and a second switch;
         a. said first switch having a first circuitry-selecting contact and a second circuitry-selecting contact;
         b. said second switch having a third circuitry-selecting contact and a fourth circuitry selecting contact;
   B. traveling to a residential facility initially with an unknown but in-place intercom wiring thereat;
   C. identifying which of said three-wire, four-wire or five-wire intercom wiring is in-place at said residential facility;
   D. installing said sole circuit board article of manufacture at said residential facility;
   E. preparing for use with said identified intercom wiring by switching said first and second switches in a permutation of contact-established conditions consisting of a first switch first contact with a second switch third contact, a first switch first contact with a second switch fourth contact, and a first switch second contact with a second switch third contact; and
   F. correlating with said in-place intercom wiring one of said permutations of contact-established conditions effective to provide intercom service;

whereby inventory of enabling intercom circuitry is confined to said sole circuit board article of manufacture.

* * * * *